United States Patent [19]

Lee

[11] Patent Number: 5,687,945

[45] Date of Patent: Nov. 18, 1997

[54] ADJUSTABLE COPY HOLDER MOUNTING BASE AND SUPPORTING ARM ASSEMBLY

[75] Inventor: Chi-Hsien Lee, Taichung, Taiwan

[73] Assignee: Chi Lung Sheng Industrial Co., Ltd., Taichung, Taiwan

[21] Appl. No.: 680,818

[22] Filed: Jul. 16, 1996

[51] Int. Cl.[6] .................................................. B41J 11/02
[52] U.S. Cl. .................. 248/442.2; 248/918; 248/276.1; 248/284.1
[58] Field of Search ........................ 248/444.1, 918, 248/442.2, 452, 282, 231.41, 448, 447, 458, 447.2, 276.1, 284.1, 288.11, 299.1; 40/341; 400/718

[56] References Cited

U.S. PATENT DOCUMENTS

| | | | |
|---|---|---|---|
| 1,685,041 | 9/1928 | Binkele | 248/442.2 |
| 1,983,981 | 12/1934 | Hanson | 248/458 |
| 2,044,589 | 6/1936 | Morgan | 248/458 |
| 4,582,285 | 4/1986 | Bello | 248/442.2 |
| 4,754,945 | 7/1988 | Diamond | 248/447 |
| 4,863,124 | 9/1989 | Ball | 248/918 |
| 5,207,791 | 5/1993 | Scherbarth | 248/918 |
| 5,297,768 | 3/1994 | Denton | 248/442.2 |
| 5,379,205 | 1/1995 | Peng | 248/282.1 |
| 5,415,372 | 5/1995 | Shepherd | 248/447 |

*Primary Examiner*—Ramon O. Ramirez
*Assistant Examiner*—Gwendolyn W. Baxter
*Attorney, Agent, or Firm*—Bacon & Thomas

[57] ABSTRACT

An assembly may be fastened to the shell of a computer monitor for holding copies. The assembly includes a supporting arm having a bottom end pivotally mounted to lugs of a mounting base and adjustably secured in position by a locating member. A face plate mount is pivotally connected to a top end of the supporting arm for holding the copies.

6 Claims, 5 Drawing Sheets

ADJUSTABLE COPY HOLDER MOUNTING BASE AND SUPPORTING ARM ASSEMBLY

BACKGROUND OF THE INVENTION

The present invention relates to copy holders, and relates more particularly to an adjustable copy holder mounting base and supporting arm assembly of a copy holder which can be conveniently and directly adjusted to the desired angle without the use of any tool.

FIG. 1 shows a conventional copy holder, which is comprised of a mounting assembly adapted for fastening to the top of a table by a tension clamp, a holder plate adapted for holding copies, and a supporting arm connected between the mounting assembly and the holder plate. The supporting arm has a middle joint adapted for adjusting the angle of the supporting arm, and a neck assembly connected to the holder plate and adapted for adjusting the angular position of the holder plate. This structure of copy holder is inconvenient to collapse and store, and occupies much table space. Furthermore, it is not easy to adjust this copy holder to the desired angular position. There are known other structures of copy holders adapted for mounting on a table to hold copies. However, these copy holders commonly occupy much storage space.

SUMMARY OF THE INVENTION

It is one object of the present invention to provide a copy holder mounting base and supporting arm assembly which requires less installation space. It is another object of the present invention to provide a copy holder which can be conveniently adjusted to the desired angle. It is still another object of the present invention to provide a copy holder which is easy to assemble. To achieve these and other objects of the present invention, there is provided a copy holder mounting base and supporting arm assembly which is comprised of a mounting base adapted for fastening to the shell of a computer monitor and having two upright lugs at the top, a supporting arm having a bottom end pivoted to the lugs of the mounting base and adjustably secured in position by a snap and a toothed locating member, a face plate mount adapted for holding a face plate for holding copies and having a toothed, tubular coupling block pivotably connected to the top end of the supporting arm by a first fastening device and a second fastening device, the first and second fastening devices having a respective coupling portion with retaining ribs fastened to respective transverse grooves and retaining portions at the top end of the supporting arm, the first fastening device having a toothed socket mounted in the toothed, tubular coupling block of the face plate mount and meshed with teeth thereof, and the second fastening device having a stub fitted into the toothed socket of the first fastening device.

DETAILED DESCRIPTION OF THE PREFERRED EMBODIMENT

Figure 1:
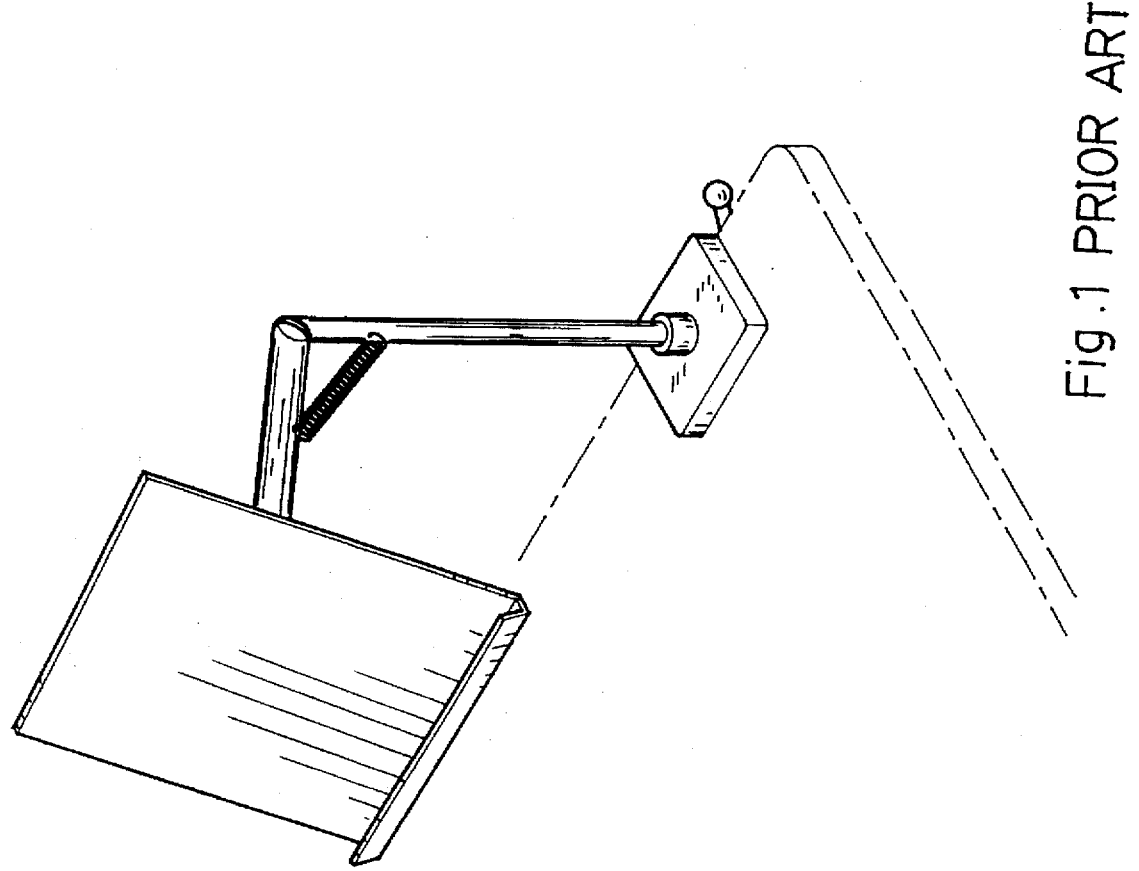
FIG. 1 is an elevational view of a copy holder according the prior art.
Figure 2:
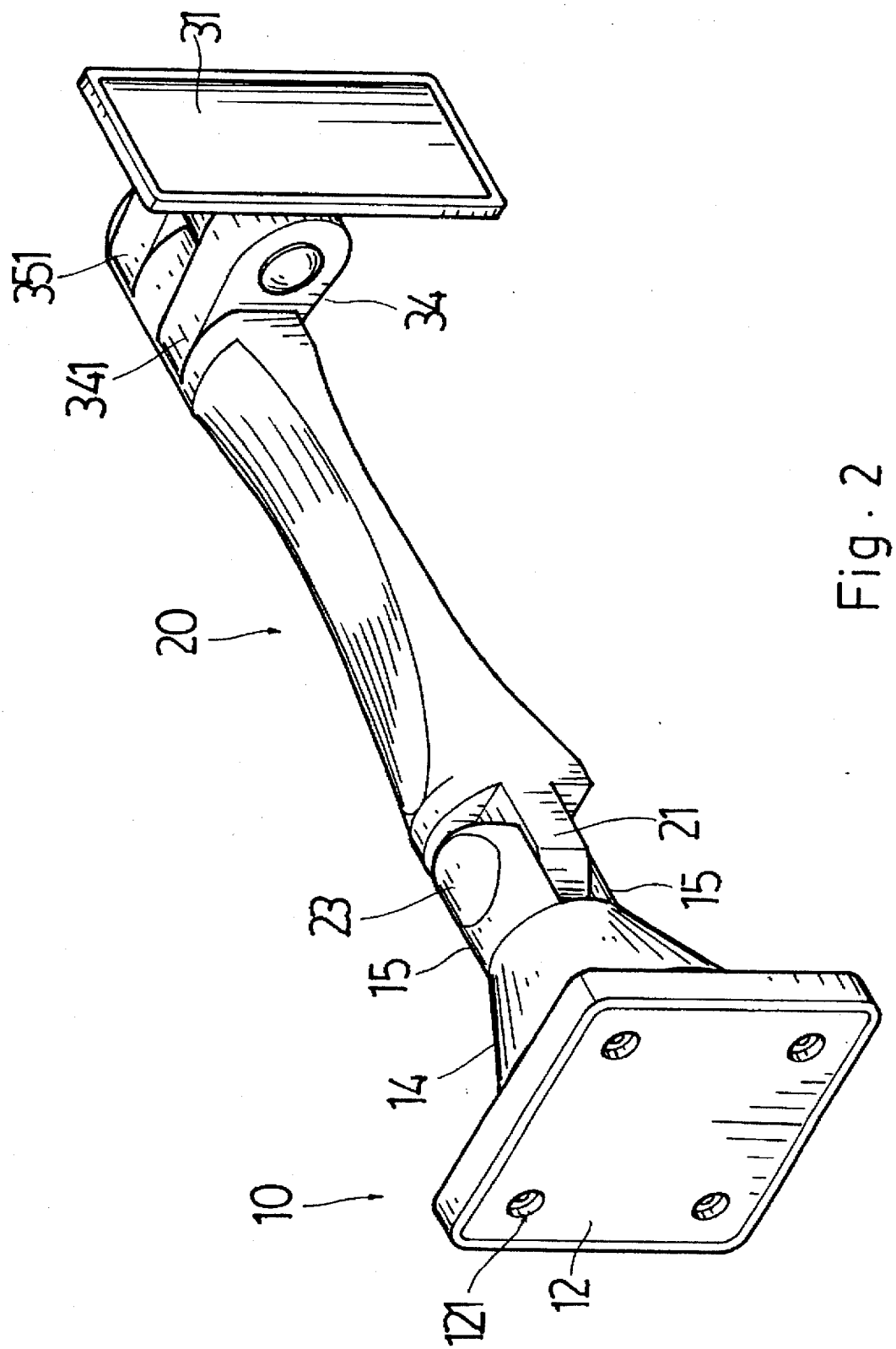
FIG. 2 is an elevational view of a copy holder mounting base and supporting arm assembly according to the present invention.
Figure 3:
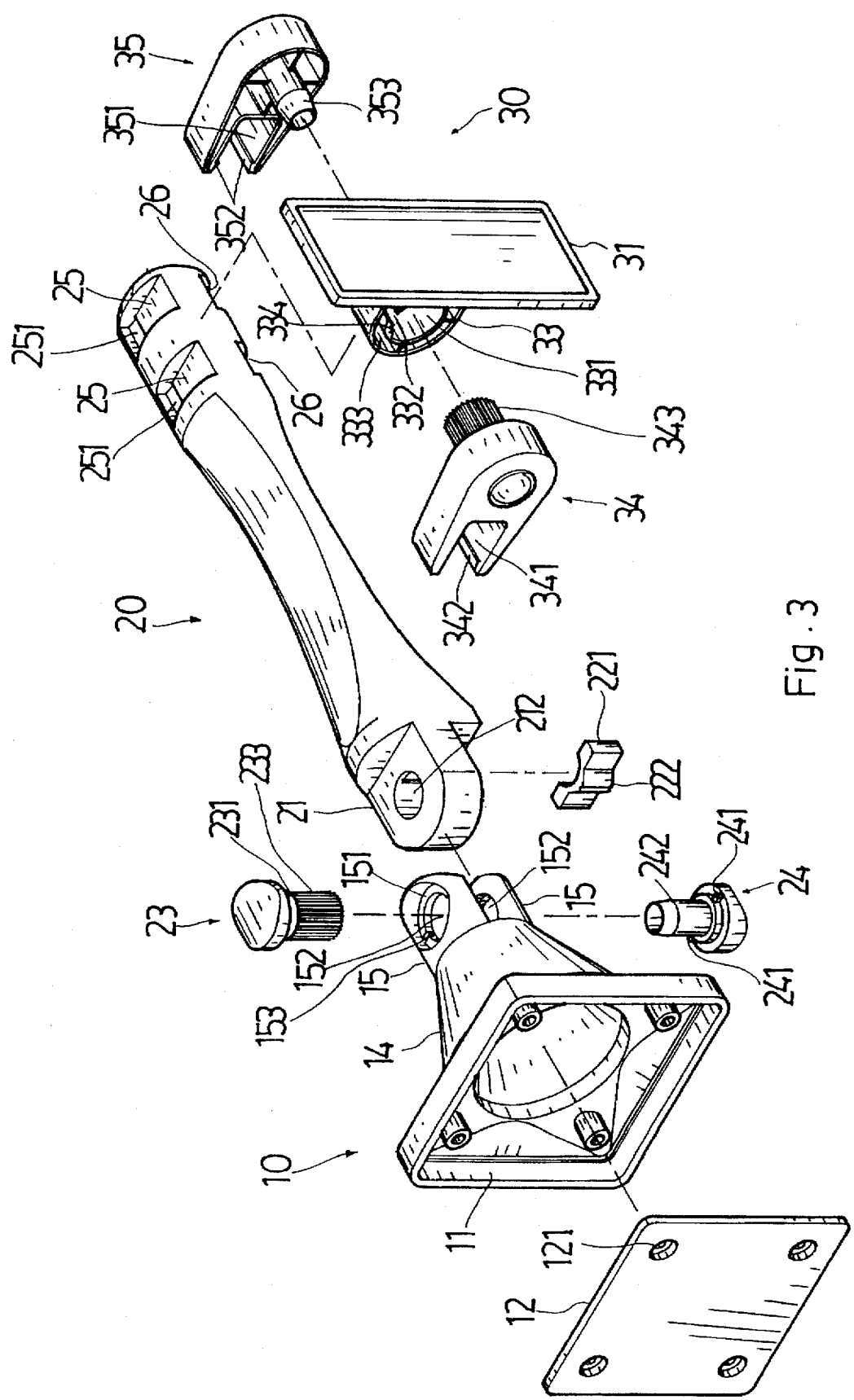
FIG. 3 is an exploded view of the copy holder mounting base and supporting arm assembly shown in FIG. 2.
Figure 4:
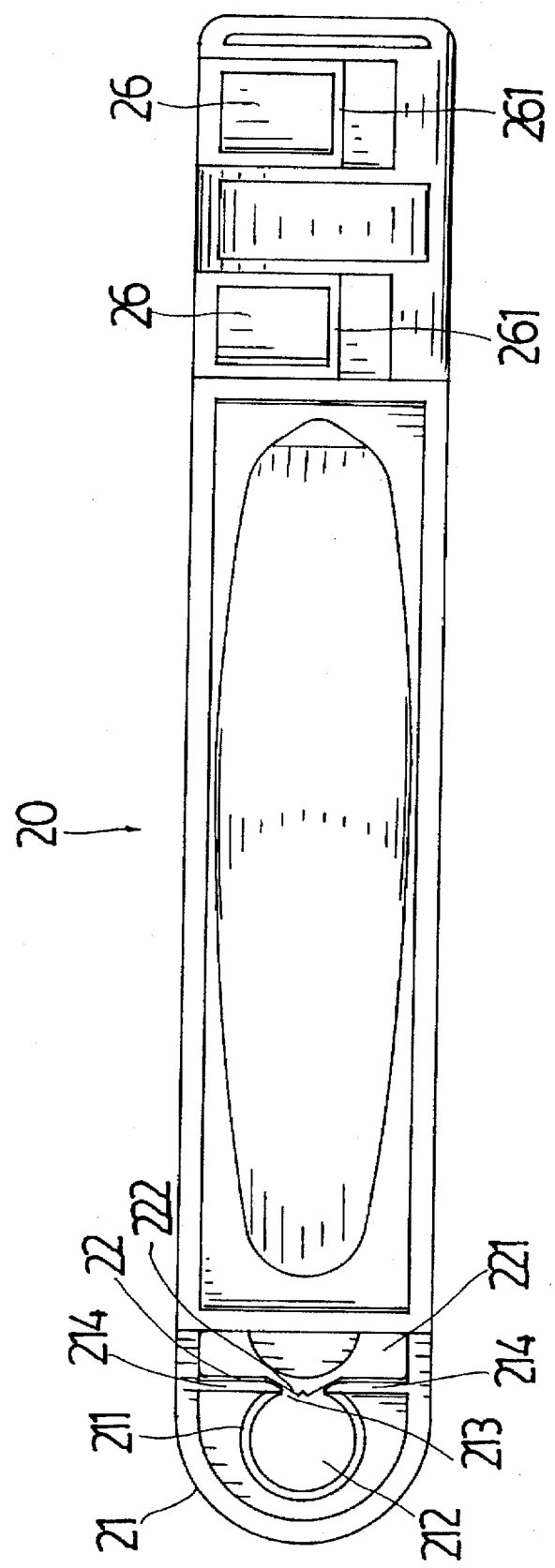
FIG. 4 is a bottom view of the supporting arm of the copy holder mounting base and supporting arm assembly shown in FIG. 2.
Figure 5:
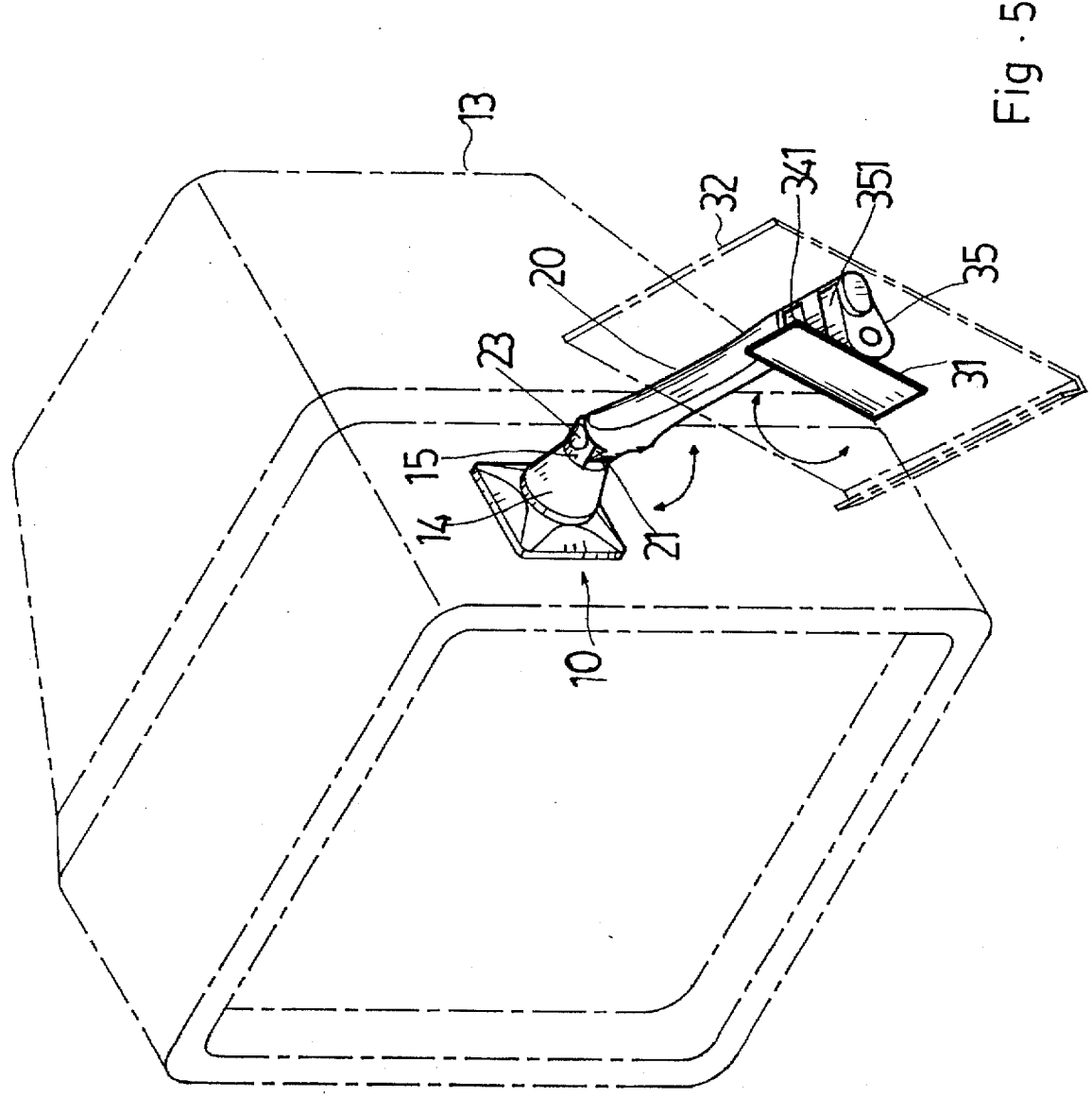
FIG. 5 is a perspective view of the present invention, showing the copy holder mounting base and supporting arm assembly adjustably mounted on the shell of a monitor.

Referring to FIGS. 2 to 5, a copy holder mounting base and supporting arm assembly in accordance with the present invention is generally comprised of a mounting base 10, a supporting arm 20, and a face plate holder 30.

The mounting base 10 is a hollow structure comprising a conical body 14, a bottom hole 11 at the bottom of the conical body 14, a mounting plate 12 fitted into the bottom hole 11 and having mounting holes 121 adapted for fastening to the shell of the monitor 13 of a computer system by fastening elements, and two parallel lugs 15 extending from the smaller end of the conical body 14. Each of the lugs 15 comprises a recess 151 at an outer side, a through hole 152 at the center of the recess 151, and locating grooves 153 bilaterally disposed in the recess 151.

The supporting arm 20 (see FIG. 4) comprises a flat coupling block 21 at one end, and two pairs of opposed transverse grooves 25, 26 bilaterally disposed at an opposite end. The transverse grooves 25, 26 have a respective retaining portion 251 or 261. The flat coupling block 21 comprises a through hole 212 at the center connected between the through holes 152 of the lugs 15 of the mounting base 10 by a male button 24 and a female button 23. A smoothly arched flange 211 extends from one side around the through hole 212 and defines a mouth 213, and two pairs of parallel transverse flanges 214 bilaterally extending outwards from two opposite ends of the smoothly arched flange 211 and defining a receiving chamber 22. A locating member 221 is mounted in the receiving chamber 22, and includes a toothed arc portion 222 in the middle projecting through the mouth 213 into the through hole 212. The male button 24 and the female button 23 form a snap, having a respective pair of radial locating ribs 231, 241 respectively forced into engagement with the locating grooves 153 of the lugs 15. The female button 23 comprises an externally toothed socket 233 inserted into the through hole 152 of one lug 15 and meshed with the toothed arc portion 222 of the locating member 221. The male button 24 comprises a stud 242 inserted through the through hole 152 of one lug 15 and fitted into the externally toothed socket 233 of the female button 23. When the supporting arm 20 is turned relative to the lugs 15 of the mounting base 10, the toothed arc portion 222 of the locating member 221 is forced to deform and to move relative to the externally toothed socket 233 of the female button 23. When the supporting arm 20 is released from the hand, the toothed arc portion 222 of the locating member 221 and the externally toothed socket 233 of the female button 23 are engaged again to hold the supporting arm 20 in the adjusted position.

The face plate holder 30 comprises a face plate mount 31 adapted for holding a face plate 32 for holding copies. The face plate mount 31 comprises a coupling block 33 at the back adapted for coupling to the supporting arm 20 by a first fastening device 34 and a second fastening device 35. The coupling block 33 comprises a center through hole 331, an axial split 332 in communication with the center through hole 331, two annular open chambers 333 around two opposite ends of the center through hole 331, and a plurality of teeth 334 within the center through hole 331 adjacent to the axial split 332. The first fastening device 34 and the second fastening device 35 have a respectively coupling portion 341, 351 respectively attached to the transverse grooves 25, 26 of the supporting arm 20, and retaining ribs 342, 352 respectively forced into engagement with the retaining portions 251, 261 in the transverse grooves 25, 26. The first fastening device 34 further comprises an externally toothed socket 343 perpendicularly disposed at one end remote from the coupling portion 341. The externally toothed socket 343 of the first fastening device 34 is inserted into the center through hole 331 of the coupling block 33 and forced into engagement with the teeth 334 of the coupling block 33. The second fastening device 35 further comprises a stud 353 perpendicularly disposed at one end remote from the coupling portion 351, The stud 353 of the second fastening device 35 is inserted into the center through hole 331 of the coupling block 33 and fitted into the externally toothed socket 343 of the first fastening device 34. The face plate mount 31 can be turned about the externally toothed socket 343 of the first fastening device 34 to change the angular position of the face plate 32 relative to the supporting arm 20. The axial split 332 permits the center through hole 331 to be expanded radially for allowing the coupling block 33 of the face plate mount 31 to be turned about the externally toothed socket 343 of the first fastening device 34 without damaging the teeth 334.

As indicated, the angular position of the supporting arm 20 relative to the mounting base 10 and the angular position of the face plate holder 30 relative to the supporting arm 20 can be conveniently and directly adjusted without the use of any tool.

I claim:

1. An adjustable copy holder mounting base and supporting arm assembly comprising:

a mounting base adapted for fastening to a shell of a computer monitor, said mounting base comprises two upright parallel lugs extending from a top thereof, each of said parallel lugs comprising a recess, and a through hole extending through a center of said recess;

a supporting arm having a first end terminating in a flat coupling block inserted in between the lugs of said mounting base and secured thereto by a male button and a female button, and a second end adapted for coupling to a face plate holder, the flat coupling block of said supporting arm comprising a through hole at a center connected between the through holes of the parallel lugs of said mounting base, a smoothly arched flange extending from one side around the through hole of said flat coupling block and defining a mouth, two pairs of parallel transverse flanges bilaterally extending outwardly from two opposite ends of said smoothly arched flange and defining a receiving chamber, a toothed locating member mounted in said receiving chamber and meshed with said female button, said female button comprising an externally toothed socket inserted into the one recess through hole of said mounting base and meshed with said toothed locating member to hold said supporting arm in position, said male button comprising a stud inserted through the other recess through hole and fitted into the externally toothed socket of said female button; and a face plate holder secured to the second end of said supporting arm for holding copies, said face plate holder comprising a face plate mount adapted for holding a face plate for holding copies and having a coupling block at a back side, a first fastening device and a second fastening device fastened together and fixed to the second end of said supporting arm to hold said face plate mount, the coupling block of said face plate mount comprising a center through hole, an axial split in communication with the center through hole of the coupling block of said face plate mount, two annular open chambers around two opposite ends of the center through hole of the coupling block of said face plate mount, and a plurality of teeth within the center through hole of the coupling block of said face plate mount adjacent to said axial split, said first fastening device having one end fixed to the second end of said supporting arm, and an externally toothed socket perpendicularly disposed at an opposite end inserted into the center through hole of the coupling block of said face plate mount and forced into engagement with the teeth of the coupling block thereof, said second fastening device having one end fixed to the second end of said supporting arm, and a stud perpendicularly disposed at an opposite end and inserted into the center through hole of the coupling block of said face plate mount and fitted into the externally toothed socket of said first fastening device.

2. The adjustable copy holder mounting base and supporting arm assembly of claim 1 wherein said mounting base comprises a bottom hole, a mounting plate fitted into said bottom hole and having mounting holes adapted for fastening to the shell of a computer monitor by fastening devices.

3. The adjustable copy holder mounting base and supporting arm assembly of claim 1 wherein the recess of each of the lugs of said mounting base comprises two locating grooves adapted for engaging with said male button and said female button.

4. The adjustable copy holder mounting base and supporting arm assembly of claim 3 wherein said male button and said female button comprises a respective pair of radial locating ribs respectively forced into engagement with the locating grooves of the recesses of the lugs of said mounting base.

5. The adjustable copy holder mounting base and supporting arm assembly of claim 1 wherein said toothed locating member comprises a toothed arc portion projecting through the mouth at one side of the flat coupling block into the through hole thereof and meshed with the toothed socket of said female button.

6. The adjustable copy holder mounting base and supporting arm assembly of claim 1 wherein the second end of said supporting arm comprises two pairs of transverse grooves at two opposite sides, and two pairs of retaining portions respectively disposed in said transverse grooves; said first fastening device and said second fastening device comprise a respective coupling portion respectively coupled to the transverse grooves of the second end of said supporting arm, and a respective pair of opposite retaining ribs respectively forced into engagement with the retaining portions in the transverse grooves of the second end of said supporting arm.

* * * * *